United States Patent [19]

Olson et al.

[11] 4,205,746
[45] Jun. 3, 1980

[54] LIFTING DEVICES EMPLOYED IN REMOVING AND INSTALLING ROTATING CONVEYOR ROLLS IN AN OPERATING CONVEYING SYSTEM

[75] Inventors: Earl J. Olson; Charles W. Sutton, both of Lathrop, Calif.

[73] Assignee: Libbey-Owens-Ford Company, Toledo, Ohio

[21] Appl. No.: 857,206

[22] Filed: Dec. 5, 1977

[51] Int. Cl.² .............................................. B65G 13/06
[52] U.S. Cl. .................................... 198/791; 432/246
[58] Field of Search ............... 198/780, 782, 789, 791; 432/246

[56] References Cited

U.S. PATENT DOCUMENTS

| | | | |
|---|---|---|---|
| 1,447,648 | 3/1923 | Devlin | 198/780 |
| 1,885,306 | 11/1932 | Sylvester | 198/791 |
| 2,014,302 | 9/1935 | Waldron | 432/246 |
| 3,867,748 | 2/1975 | Miller | 432/246 |

Primary Examiner—Jeffrey V. Nase
Attorney, Agent, or Firm—Collins, Oberlin & Darr

[57] ABSTRACT

Devices for lifting and lowering the driven ends of large, heavy rotating conveyor rolls and having a rigid member provided with portions engaging bearing housings journalling the driven ends of the rolls. Rotatable members, operatively connected to the rigid member, lift and lower the engaging portions in a vertical path relative to a stationary surface mounting the bearing housings so that shims supporting the conveyor rolls in a common planar position may be removed or placed therebeneath, whereby conveyor rolls in the conveying system can be removed and installed.

4 Claims, 8 Drawing Figures ously operating drive train. Customarily, each roll in the conveying system is driven by a worm gear connected to a mechanical line shaft extending the length of the lehr. Since the lehr must be operated continuously in producing the glass ribbon, the replacement of defective conveyor rolls, for example those requiring grinding, is a problem as they are heavy and of large size and must be replaced while the lehr is operating.

LIFTING DEVICES EMPLOYED IN REMOVING AND INSTALLING ROTATING CONVEYOR ROLLS IN AN OPERATING CONVEYING SYSTEM

BACKGROUND OF THE INVENTION

1. Field of the Invention

This invention generally relates to lifting devices and more particularly to devices employed in removing and installing rotating conveyor rolls in a continuously operating conveying system.

2. Description of the Prior Art

In the production of glass, it is customary to produce a continuous ribbon of glass from a molten mass and pass this plastic ribbon through an annealing lehr which operates continuously with a melting furnace producing the molten mass of glass. It is well known that in passing the continuous glass ribbon through the lehr, that it is conveyed on rolls that are commonly driven from a continuously operating drive train. Customarily, each roll in the conveying system is driven by a worm gear connected to a mechanical line shaft extending the length of the lehr. Since the lehr must be operated continuously in producing the glass ribbon, the replacement of defective conveyor rolls, for example those requiring grinding, is a problem as they are heavy and of large size and must be replaced while the lehr is operating.

Heretofore, a defective conveyor roll was replaced by first inserting a bar into the driven open end of the roll, which is normally hollow, and a jack having an appropriate extension was placed on the floor in position to engage the bar. The jack was then raised to lift the bar, and thus the end of the conveyor roll, just enough to remove a shim from beneath the bearing housing journalling the end of the roll. The jack was then lowered which, of course, disengaged the worm wheel from the rotating worm on the line shaft, and the disconnected conveyor roll was removed from the conveying system of the lehr. Of course, a conveyor roll was installed in the conveying system by reversing the above-described procedure.

However, this procedure has not been entirely satisfactory in that damage to the drive train may occur because of the small amount of clearance provided between the worm wheel and the driving worm and the inability to precisely lift the bar and firmly hold the end of the conveyor roll with a floor supported jack. In accordance with the present invention, the movement of the end of the roll having a worm wheel can be precisely controlled and the end of the conveyor roll firmly held to prevent damage to the drive train while it is in operation.

SUMMARY OF THE INVENTION

Generally stated, the present invention contemplates providing devices for lifting and lowering the bearing housings mounting the bearings journalling the driven ends of rotating conveyor rolls wherein shims disposed between the bearing houses and a stationary surface support the rolls in a common planar position. The devices are supported from a stationary surface and have portions engaging the bearing housings, which portions are precisely lifted and lowered by rotating threaded lifting members, thus permitting the shims to be inserted and/or removed from beneath the bearing housings. The ends of the conveyor rolls are firmly held by assuring that a certain amount of force is maintained on the bearing housings. This is accomplished by tightening or loosening the bearing housing bolts while simultaneously operating the lifting member to snugly hold the bearing housings relative to the stationary surface.

OBJECTS AND ADVANTAGES

An object of this invention is to provide a lifting and lowering device whose movements can be precisely controlled.

Another object of this invention is to provide a lifting and lowering device that snugly engages the members being moved.

Yet another object of this invention is to provide a lifting and lowering device that is simple in construction, easy to manufacture and efficient in operation.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENTS

Figure 1:
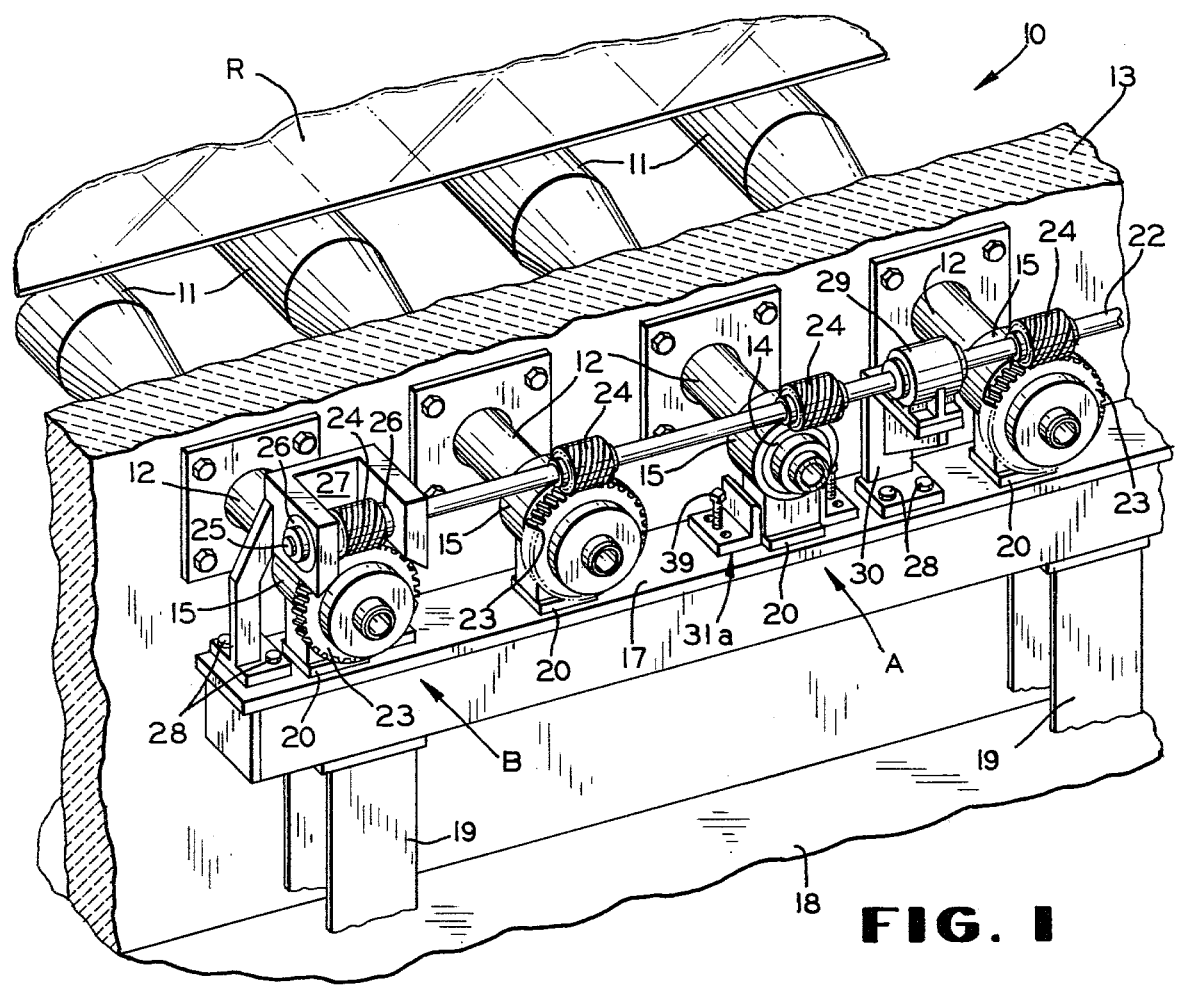
FIG. 1 is a fragmentary perspective view of a glass annealing lehr and its conveying system wherein the present invention is employed.

In FIG. 1 there is illustrated a portion of an annealing lehr 10 customarily employed in the manufacture of a continuous ribbon of glass R. The lehr 10 generally comprises a closed refractory structure (not shown) and a conveying system comprising a plurality of longitudinally spaced driven conveyor rolls 11 extending transversely of the closed structure for conveying the glass ribbon R therethrough. One end 12 of each roll 11 projects through a sidewall 13 forming part of the closed structure. The end 12 of each roll 11 is journalled in a bearing 14 mounted in a housing 15 affixed by a bolt 16 (see FIGS. 3, 4 and 7) to a horizontally disposed rail 17 extending longitudinally along the length of the lehr 10, which rail 17 is supported in spaced relation above the floor 18 on upstanding legs 19. A shim 20 located beneath each of the bearing housings 15 supports the end 12 and thus the surface of each roll 11 in a spaced, planar position above the rail 17. Each shim 20 (see FIG. 2) is provided with an open end slot 21 which surrounds the bolts 16 so that it may be removed or installed beneath the bearing housing 15 without removing the bolt 16 from the bearing housing 15 for a purpose to be described hereinafter.

As best illustrated in FIG. 1, the conveyor rolls 11 are commonly driven by a mechanical line shaft 22 extending longitudinally along the length of the lehr 10 which is drivingly connected to a motor (not shown). More particularly, the end 12 of each roll 11 is provided with a driven worm wheel 23 which meshes with a worm 24 affixed to the driven line shaft 22 for rotation therewith. The line shaft 22, of course, is supported in spaced relation above the ends 12 of the rolls 11 so as to provide the proper clearance between the meshing worm wheel 23 and the worm 24. Specifically, the free end 25 of the line shaft 22 is journalled in a pair of bearings 26, one on each side of the worm 24, which are mounted in a saddle-type supporting bracket 27 secured to the rail 17 by bolts 28. Intermediate sections of the line shaft 22 are journalled in coupling-type bearings 29 (only one shown) supported by U-shaped brackets 30 also secured to the rail 17 by bolts 28.

The present invention contemplates providing two types of lifting devices, each designated in its entirety by the reference numerals 31a and 31b, by which an operator can precisely lift and firmly hold the end 12 of any conveyor roll 11 in an operating conveying system to remove and/or replace the roll 11 therein. Briefly, each lifting device 31a and 31b generally comprises a rigid member having portions for engaging the bearing housing 15 and means for raising and lowering the engaging portions whereby an operator can remove or place the shim 20 beneath the bearing housing 15 to engage or disengage the worm wheel 23 with the worm 24.

Figure 2:
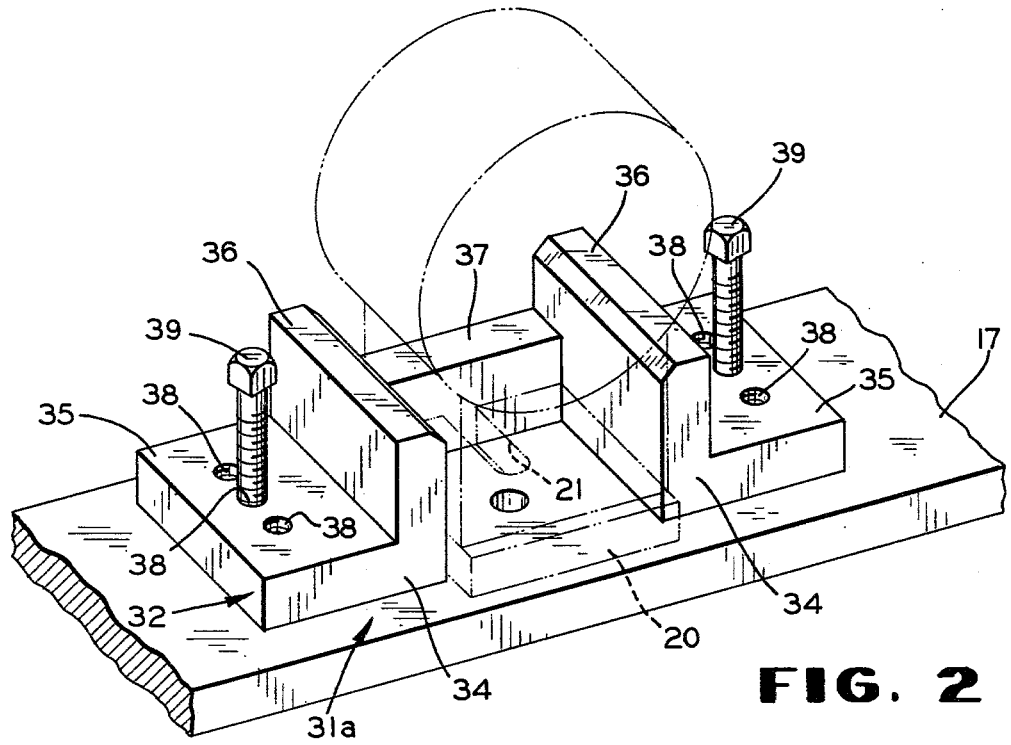
FIG. 2 is an enlarged perspective view, taken in the direction of arrow A in FIG. 1, of a lifting device constructed in accordance with the present invention.
Figure 3:
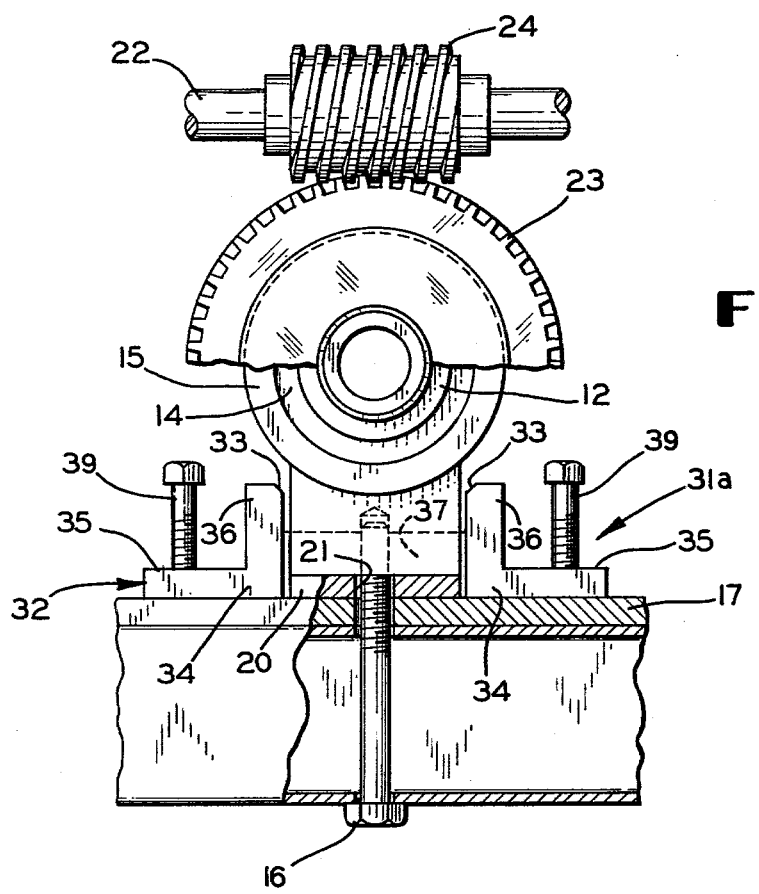
FIG. 3 is an enlarged, front elevational view of the lifting device illustrated in FIGS. 1 and 2 and shown in its lowermost position.
Figure 4:
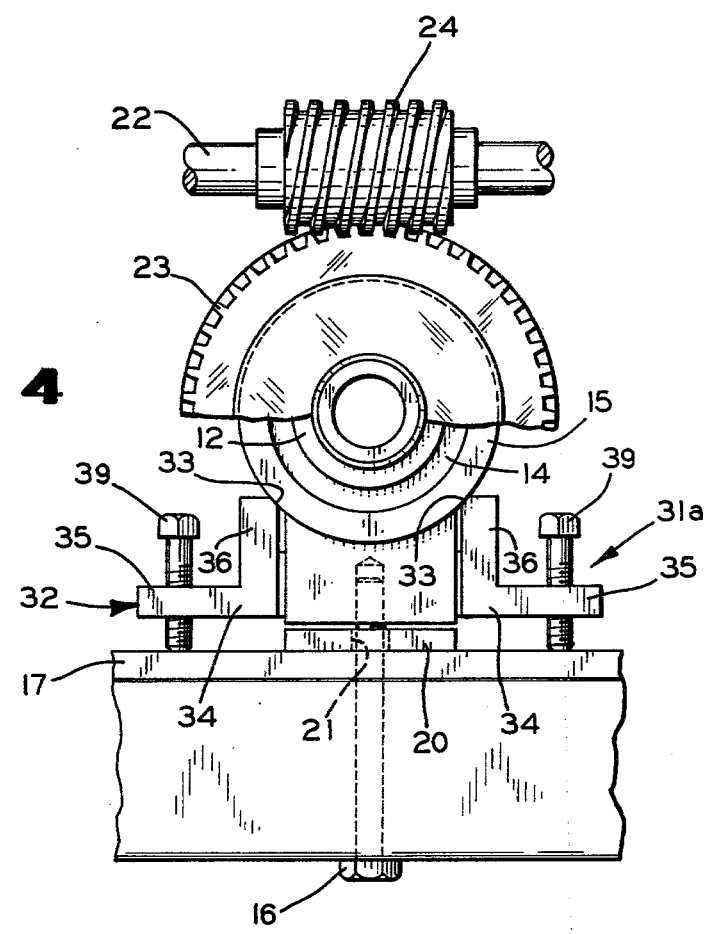
FIG. 4 is an enlarged view similar to FIG. 3 but with the lifting device shown in its raised position.

In the embodiment of the invention illustrated in FIGS. 2, 3 and 4 and shown in a working position in FIG. 1, the lifting device 31a is constructed to be used with any intermediate conveyor roll 11. The lifting device 31a includes a U-shaped bracket 32 that is adapted to surround the bearing housing 15, and wherein the legs of the bracket 32 have portions 33 engaging the bearing housing 15. More specifically, each of the legs of the U-shaped bracket 32 comprises an angle member 34 having a horizontal flange portion 35 and an upstanding portion 36 which are rigidly connected together at one of their ends by a tie bar 37. The inner top edges of the upstanding portions 36 are chamfered to provide the engaging portions 33 previously described. Each horizontal flange portion 35 of the angle members 34 is provided with at least one central aperture 38 for rotatably receiving a jack screw 39.

When an intermediate conveyor roll 11 is to be removed from the conveying system, for example, the device 31a is placed on the rail 17 so that it surrounds the bearing housing 15 with its tie bar 37 adjacent the rear of the housing 15 (see FIGS. 1 and 3). The jacking screws 39 on each side of the bracket 30 are then rotated to first raise the rigid U-shaped bracket 30 and its chamfered engaging portions 33 snugly against the bearing housing 15 and then lift the housing from the shim 20. The clearance between the worm gear 23 and its meshing worm 24 is sufficient to permit the housing 15 to move off the shim 20.

In order to prevent any damage from occurring to the worm gear and/or line shaft, it is desirable to confine the movement of the end 12 of the conveyor roll 11 only to a vertical path. Accordingly, the jacking screws 39 are equally rotated on each side of the bracket 30 to keep the engaging portions 33 thereof snugly engaged with the bearing housing 15 while loosening the housing bolt 16 an equal amount. This procedure is continued until the bearing housing 15 is moved off the shim 20 as illustrated in FIG. 4, at which time the operator can slide the shim from beneath the housing 15.

After the shim 20 is removed, the above-described procedure is reversed; that is, the jacking screws 39 are rotated in a direction to lower the bearing housing 15 while the housing bolt 16 is tightened to draw the housing 15 towards the rail 17, whereby the housing is firmly held on the rail while the worm wheel 23 is smoothly disengaged from the rotating worm 24. The conveyor roll 11 is then removed endwise from the conveying system in a customary manner.

When a conveyor roll 11 is to be installed in an operating conveyor system, the above-described procedure is reversed.

Figure 5:
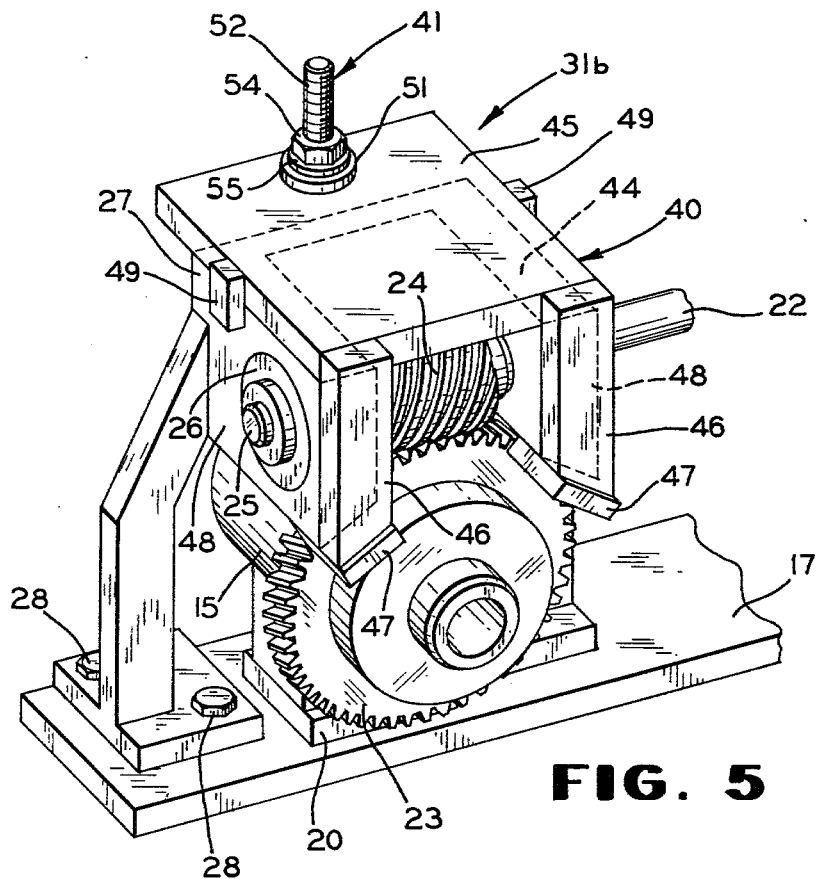
FIG. 5 is an enlarged perspective view, taken in the direction of arrow B in FIG. 1, of another embodiment of a lifting device constructed in accordance with the invention.
Figure 6:
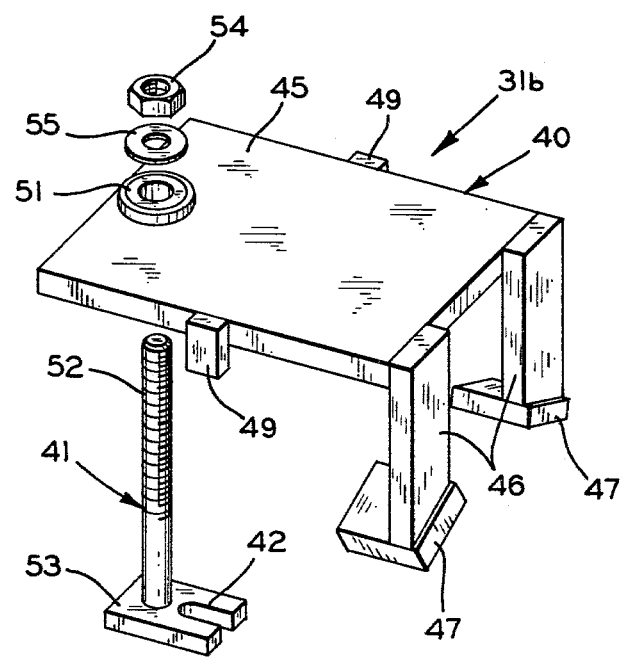
FIG. 6 is an enlarged perspective view of the lifting device illustrated in FIG. 5.
Figure 7:
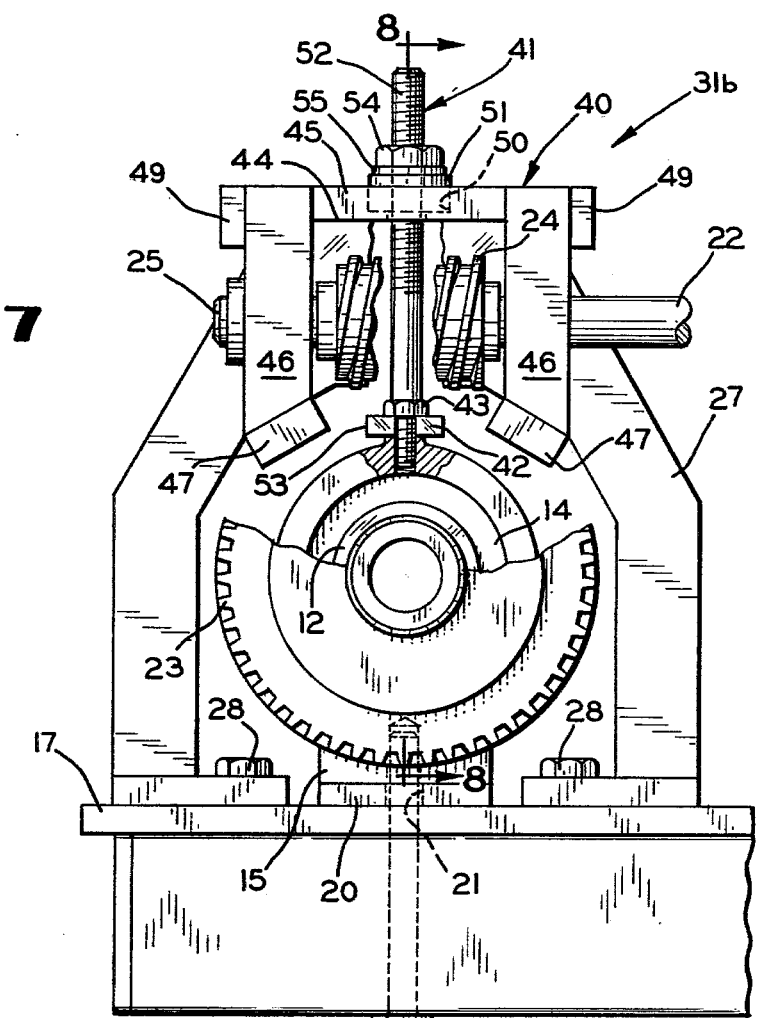
FIG. 7 is an enlarged front elevational view of the lifting device as illustrated in FIG. 5.
Figure 8:
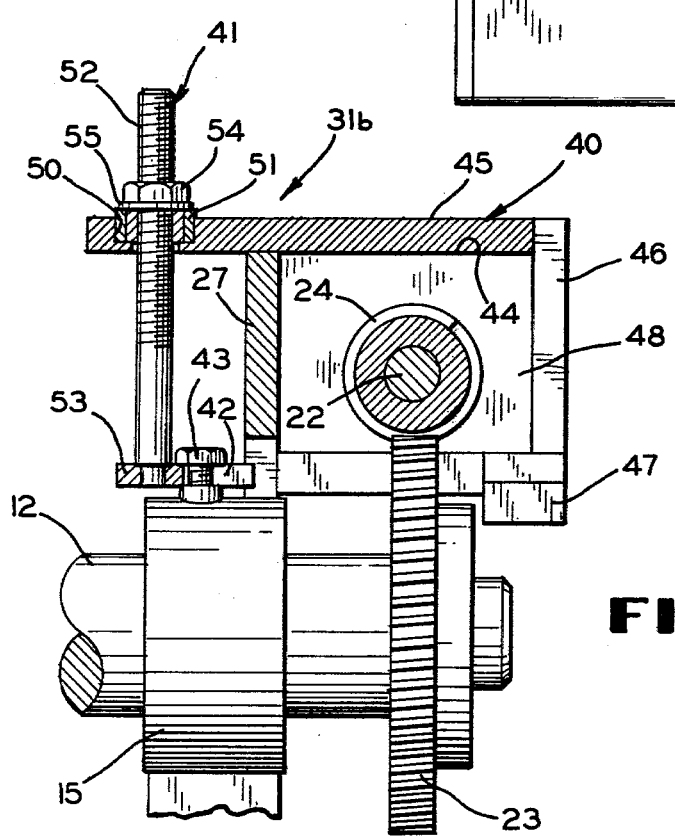
FIG. 8 is a fragmentary cross sectional view taken substantially along line 8—8 of FIG. 7.

The embodiment of the invention illustrated in FIGS. 6 through 8, and shown in a working position in FIG. 5, is adapted to be used in removing and installing conveyor rolls 11 where the bearing housing 15 is surrounded by the saddle bracket 27. Accordingly, the lifting device 31b is constructed to rest on the top surface of the bracket 27, and generally includes an anchor member 40 and a lifting pin 41 movably mounted thereon. The lifting pin 41 is provided with an engaging portion 42 that is adapted to engage a bolt 43 which is threaded into the tapped aperture from which the customary lubrication fitting (not shown) provided in the housing for lubricating the bearings 14 has been removed.

Referring particularly to FIGS. 5 and 6, the anchor member 40 is constructed to be detachably mounted on the top surface 44 of the bracket 27, and includes a plate 45 having a pair of legs 46 depending from one end thereof. Each leg 46 is provided with a lug 47 which engages the undersurface of flanges 48 projecting outwardly from the bracket 27. Each side of the plate 45 is provided with a depending tang 49 which engages the outer adjacent side of the corresponding flange 48 to prevent longitudinal movement of the plate 45 with respect to the bracket 27.

As illustrated in FIGS. 5 and 8, a portion of the plate 45 extends beyond the flanges 48 of the bracket 27 and above the bearing housing 15. This portion of the plate 45 is provided with a counterbored aperture 50 in which is disposed a thrust bearing 51 which receives the lifting pin 41 for axial movement relative thereto.

The lifting pin 41 is elongated and has a threaded shank 52 which extends through the bearing 51, and its lower end is provided with a slotted shoe 53 securely attached thereto, wherein the surface defining the slot forms the engaging portion 42. A nut 54 constituting the rotatable member, threaded on the shank 52 and abutting a washer 55 lying on the exposed end of the thrust bearing 51, moves the lifting pin relative to the anchor member 40.

When a conveying roll 11 whose supporting bearing housing 15 is surrounded by the saddle bracket 27 is to be removed from or installed in an operating conveying system, the lifting device 31b is employed. In use, the device 31b is placed on the top surface 44 of the bracket 27 with its anchor lugs 47 engaging the underside of the flanges 48, and with the slot in the shoe 53 on the lifting pin 41 surrounding the shank of the bolt 43 as shown in FIGS. 5 and 8. The nut 54 is then rotated in a direction to raise the engaging portion 42 on the shoe 53 snugly against the head of the bolt 43. The bearing housing bolt 16 (see FIG. 7) is then loosened while the shoe 53 is raised to lift the bearing housing 15 off the shim 20, at which time an operator can remove the shim 20 from beneath the housing 15. After the shim 20 is removed, the above-described procedure is reversed; that is, the nut 54 is rotated in a direction to lower the bearing housing 15 while the housing bolt 16 is tightened to draw the housing towards the rail 17 to prevent damage to the end of the roll 11 and/or its rotating mechanism. Of course, when a conveyor roll 11 is to be installed by the lifting device 31b, the above-described procedure is reversed.

It is to be understood that the forms of the invention herewith shown and described are to be taken as illustrative embodiments only of the same, and that various changes in the shape, size and arrangement of the parts may be resorted to without departing from the spirit of the invention.

I claim:

1. A device for precisely lifting and lowering the end of a heavy, large rotating conveyor roll in a driven conveying system wherein the end of the roll is journalled in a bearing housing supported on a longitudinally extending support rail by a shim disposed therebetween, and is drivingly connected to a rotating line shaft, the device comprising:
   a. a movable rigid member having portions engageable with said bearing housing; and
   b. rotatable means operatively connected to said rigid member for moving said engageable portions on said rigid member into engagement with said bearing housing for lifting and lowering said bearing housing, said rotatable means comprising at least a pair of jacking screws which are threadedly received in said rigid member and bear against said longitudinally extending support rail whereby an operator can operate said device to precisely lift and lower said bearing housing relative to said rail to insert or remove said shim therebetween and thereby to selectively engage or disengage the driven connection between said conveyor roll and said rotating line shaft.

2. A device for precisely lifting and lowering the end of a heavy, large rotating conveyor roll in a driven conveying system wherein the end of the roll is journalled in a bearing housing supported on a longitudinally extending support rail by a shim disposed therebetween, and is drivingly connected to a rotating line shaft, the device comprising:
   a. a movable rigid member having portions engageable with said bearing housing, said movable rigid member comprising a U-shaped member surrounding said bearing housing; and
   b. rotatable means operatively connected to said rigid member for moving said engageable portions on said rigid member into engagement with said bearing housing for lifting and lowering said bearing housing, said rotatable means comprising at least two jacking screws, one threaded in each leg of said U-shaped member and bearing against said longitudinally extending support rail whereby an operator can operate said device to precisely lift and lower said bearing housing relative to said rail to insert or remove said shim therebetween and thereby to selectively engage or disengage the driven connection between said conveyor roll and said rotating line shaft.

3. A device for precisely lifting and lowering the end of a heavy, large conveyor roll in a driven conveying system wherein the end of the roll is journalled in a bearing housing supported on a longitudinally extending rail by a shim disposed therebetween and is drivingly connected to a rotating line shaft, the device comprising:
   a. a movable rigid member having portions engageable with said bearing housing;
   b. rotatable means operatively connected to said rigid member for moving said engageable portions on said rigid member into engagement with said bearing housing for lifting and lowering said bearing housing whereby an operator can operate said device to precisely lift said bearing housing relative to said rail to insert or remove said shim therebetween and thereby to selectively engage or disengage the driven connection between said conveyor roll and said rotating line shaft; and
   c. an anchor plate supported from said longitudinally extending rail and wherein said movable rigid member comprises a lifting member having a threaded shank and a slotted shoe attached thereto, which is disposed in a plane above said bearing housing, said slotted shoe engaging a bolt attached to said bearing housing and the threaded shank of said lifting member extending through said anchor plate, and wherein said rotatable means comprises a nut threadedly received on said threaded shank and bearing against said anchor plate.

4. A device for precisely lifting and lowering the end of a heavy, large rotating conveyor roll in a constantly driven conveying system as claimed in claim 3, including a bearing mounted in said anchor plate through which said threaded shank of said rigid member extends and said nut bears thereagainst.

* * * * *